US007168501B2

(12) United States Patent
Willibald

(10) Patent No.: US 7,168,501 B2
(45) Date of Patent: Jan. 30, 2007

(54) ROTOR SYSTEM FOR GROUND MILLING OR MINE MILLING

(75) Inventor: Artur Willibald, Überlingen (DE)

(73) Assignee: Ahwi Maschinenbau GmbH, Herdwangen (DE)

( * ) Notice: Subject to any disclaimer, the term of this patent is extended or adjusted under 35 U.S.C. 154(b) by 0 days.

(21) Appl. No.: 10/479,420

(22) PCT Filed: Jun. 13, 2002

(86) PCT No.: PCT/EP02/06515

§ 371 (c)(1),
(2), (4) Date: Dec. 2, 2003

(87) PCT Pub. No.: WO02/101195

PCT Pub. Date: Dec. 19, 2002

(65) Prior Publication Data

US 2004/0200626 A1 Oct. 14, 2004

(30) Foreign Application Priority Data

Jun. 13, 2001 (DE) ................................ 101 28 518

(51) Int. Cl.
*A01B 33/00* (2006.01)

(52) U.S. Cl. ........................................................ 172/123

(58) Field of Classification Search .................. 37/189, 37/462, 465, 455, 352, 91, 302; 299/87.1, 299/39.8; 172/120, 122, 123, 540, 554
See application file for complete search history.

(56) References Cited

U.S. PATENT DOCUMENTS

| | | | | |
|---|---|---|---|---|
| 3,589,452 | A * | 6/1971 | Haker et al. | 172/548 |
| 3,958,832 | A * | 5/1976 | Sigott et al. | 299/87.1 |
| 3,991,830 | A * | 11/1976 | Shepherd | 172/180 |
| 4,006,936 | A * | 2/1977 | Crabiel | 299/39.8 |
| 4,268,089 | A * | 5/1981 | Spence et al. | 299/87.1 |
| 4,480,873 | A * | 11/1984 | Latham | 299/87.1 |
| 4,542,943 | A * | 9/1985 | Montgomery, Jr. | 299/102 |
| 4,637,753 | A * | 1/1987 | Swisher, Jr. | 404/90 |
| 4,838,729 | A * | 6/1989 | Chennels | 404/90 |
| 5,052,757 | A * | 10/1991 | Latham | 299/87.1 |
| 5,125,720 | A * | 6/1992 | Salani | 299/107 |
| 5,582,353 | A * | 12/1996 | Willibald | 241/294 |
| 5,884,979 | A * | 3/1999 | Latham | 299/106 |
| 5,904,408 | A * | 5/1999 | Olson et al. | 299/87.1 |
| 6,371,001 | B1 * | 4/2002 | Schmid | 89/1.13 |
| 6,386,641 | B2 * | 5/2002 | Mondy | 299/79.1 |
| 6,626,499 | B1 * | 9/2003 | Schenk et al. | 299/39.2 |
| 6,626,500 | B1 * | 9/2003 | Cribb et al. | 299/78 |
| 6,779,850 | B1 * | 8/2004 | Schibeci et al. | 299/87.1 |
| 2004/0145232 | A1 * | 7/2004 | Sansone et al. | 299/39.8 |

* cited by examiner

*Primary Examiner*—Victor Batson
(74) *Attorney, Agent, or Firm*—Bachman & LaPointe, P.C.

(57) ABSTRACT

A rotor system for ground milling or mine milling comprising a base rotor provided with a number of support plates for accommodating tools. The tool support plates are detachably joined to the base rotor in the rotor system. A number of segments are radially arranged around a central axis (M) and a number of retaining plates are provided in an axially interspaced manner between the individual segments.

18 Claims, 5 Drawing Sheets

ROTOR SYSTEM FOR GROUND MILLING OR MINE MILLING

BACKGROUND OF THE INVENTION

The present invention relates to a soil tiller for cutting up organic substances with a rotor system, the rotor system having a basic rotor with a plurality of carrier plates for accommodating tools.

Such soil tillers with rotor systems for working various soils are known on the market and are in use in a wide variety of forms and designs. The previous constructions of rotors are usually based on a closed tubular shell. The tool holders or the tools are attached in various forms to this tubular shell. This type of construction has an adverse effect during detonations, since their pressure wave has a large area of application and therefore considerable damage to the rotor system or the tilling machine may occur. Such repair of the tilling machine on site often involves considerable problems, since there is often no appropriate infrastructure in regions and countries contaminated with mines.

Furthermore, it is disadvantageous that conventional rotor constructions are subjected to considerable wear and are designed to be very heavy. In addition, it is disadvantageous that tool carrier plates are also often subjected to wear, distorted or destroyed, which is undesirable. These tool carrier plates cannot be exchanged on site without a great deal of work.

U.S. Pat. No. 4,342,486 describes a mining machine, in particular a rotor for mining, to which tool holders are assigned. Two tools are arranged radially at different effective diameters in the tool holder.

A similar machine is described in U.S. Pat. No. 5,582,468. There, two tools arranged radially one behind the other are assigned to a rotor at different effective diameters in a workpiece holder.

DE 43 24 234 shows a milling breaker for road and highway construction, the roller of which is fitted with tilling picks.

U.S. Pat. No. 4,614,379 discloses a device for roughening roads, having a rotor element on which picks or tools mounted in a spring-loaded manner are arranged.

U.S. Pat. No. 4,221,434 shows a tiller for tilling bituminous road surfaces with a rotor element.

The object of the present invention is to provide a rotor system of the type mentioned at the beginning which removes said disadvantages and with which a basic rotor is to be improved in a simple and cost-effective manner. In addition, the rotor system is to exhibit as little damage as possible after a mine detonation. Furthermore, the ease of handling and the interchangeability of tools and tool carrier plates are to be considerably improved.

SUMMARY OF THE INVENTION

The foregoing object is achieved by the present invention by providing a rotor system for soil or mine tillers, having a basic rotor with a plurality of carrier plates for accommodating tools, characterized in that the tool carrier plates are releasably connected to the basic rotor.

In the present invention, a soil tiller having a rotor system with a basic rotor is provided, which basic rotor is formed from a plurality of radially spaced-apart segments, the individual segments being connected to one another via retaining plates. The retaining plates are at a distance from one another in the axial direction and form corresponding cassettes.

A plurality of tools and/or tool carrier plates, in particular tool carriers, are releasably secured to the segments and/or to the retaining plates. The tool carrier plates can be secured in a directly releasable manner for accommodating tools or the tool itself. In this case, the tools, in particular the tool carrier plates, can be connected to the basic rotor, in particular to the segments, on different effective diameters.

In particular the cassette-like design of the basic rotor by means of the segments and retaining plates inserted in between results in an open type of construction, the advantage of which consists in the fact that, during a detonation, the pressure wave can be reduced more effectively than in the case of a closed tubular shell.

Furthermore, it is advantageous that no damage to the rotor system occurs. In addition, it has proved to be advantageous that a lower overall weight of the rotor in the above-mentioned lightweight type of construction is obtained in this way, so that the overall weight of the machine can also be considerably reduced. Due to the simple type of fastening between tool carrier and the basic rotor via, for example, screwed connections, the maintenance and servicing of the rotor is greatly simplified, since damaged tool plates and/or tools can be replaced on site without any problems. Working with different numbers of tools or with different tools themselves is likewise possible by simple addition or removal of tool carrier plates including tool.

A combination of different tools for producing, for example, different effective diameters is also possible. In addition, a tool carrier can be inserted free of play in a frictional or positive-locking manner between individual segments and releasably connected to the retaining plate of the basic rotor. In this way, in a lightweight construction of the rotor and with a low dead weight, very high cutting forces can be absorbed. A self-cleaning effect is produced by the cassette-like design of the basic rotor. In addition, due to the cassette-like open type of construction, the area of application during the detonation is reduced, the pressure wave can spread more effectively and leads to less mechanical damage.

Furthermore, it is intended within the scope of the present invention that a pivotable or movable counter blade is provided the rotor system, in particular the basic rotor, in order to vary a cutting gap. In this case, the counter blade can be adjusted and set relative to the effective diameter or the outer tool via lever arms, hydraulic cylinders or the like (not described and shown here). At the same time, consideration is to be given to the fact that the counter blade can be movable in a flap-like manner about a joint or can be moved in a linear manner toward the counter blade.

It is also important in the present invention that the movable counter blade is located inside the housing of the rotor system, so that all of the objects possibly cut up in a preliminary manner in a rigid counter blade can be cut up further again at the movable counter blade. In this way, the cutting-up process is optimized.

Furthermore, it has proved to be advantageous that the outer tools are preferably connected in a movable manner to the basic rotor, in particular to the tool retaining plate or to the segments, these tools, for example, adjoining a movable chain or movable articulated connections. In this case, consideration is also to be given to arranging the tools in tool carrier plates or retaining plates in a pivotable manner via appropriate oscillating or push-in pivots. This has the advantage that, in particular in the forest, when cutting up thick wood, the basic rotor 1 does not jam if thick wood in particular gets into it.

The corresponding tools are pivotable via the movable chain or via the oscillating or push-in pivot and can prevent such a jamming movement. Said tools can give way. The outer tools are accelerated outward via the corresponding centrifugal force. The tools located on the inner smaller effective diameter are preferably arranged in a fixed position, although the invention is not restricted thereto.

On the whole, a rotor system can thereby be provided which can increase a capacity, in particular a cutting-up capacity, with a basic rotor of very light design, it being possible at the same time to reduce the wear of the tools and of the basic rotor. In addition, light tilling into thick wood is possible with the rotor system according to the invention, the areas of application being reduced in particular by the yielding of the movably mounted outer tools.

BRIEF DESCRIPTION OF THE DRAWINGS

Further advantages, features and details of the invention follow from the description below of preferred exemplary embodiments and with reference to the drawing, in which.

DETAILED DESCRIPTION

Figure 1:
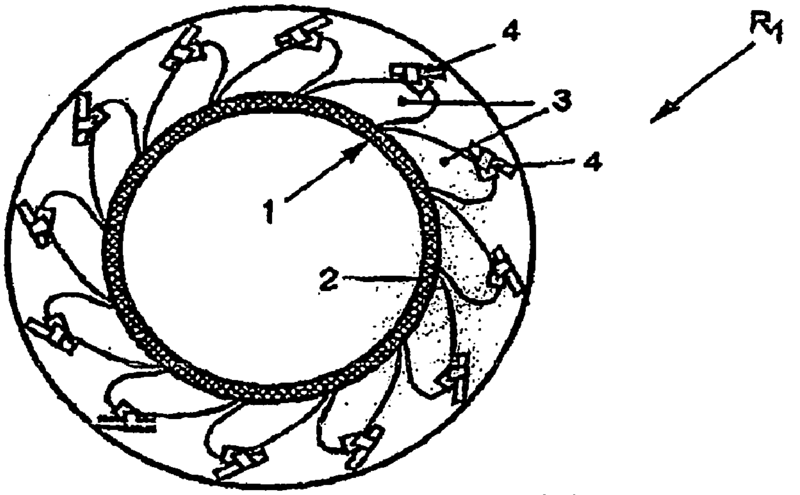
FIG. 1 shows a schematic side view of a basic rotor with mounted and welded-on tool carrier plates for accommodating tools.

Shown according to FIG. 1 is a rotor system $R_1$ which in a conventional manner has a basic rotor 1 which is usually formed from a closed tubular shell 2. Tool holders 3 or tools 4 are fastened in various forms to this tubular shell 2. A disadvantage with this rotor system $R_1$ is that, in particular during detonations, if the rotor system $R_1$ should be designed as a soil or mine tiller, the pressure wave is exerted over a large area of application on the tubular shell 2 and results in considerable damage to the rotor system $R_1$ or the tilling machine.

Figure 2:
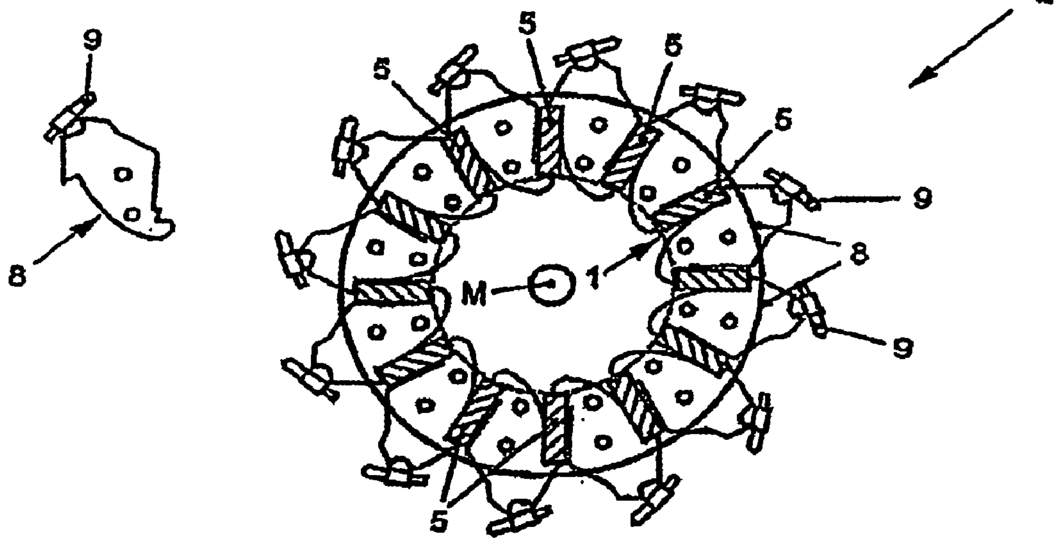
FIG. 2 shows a schematic side view of a rotor system according to the invention.
Figure 3:
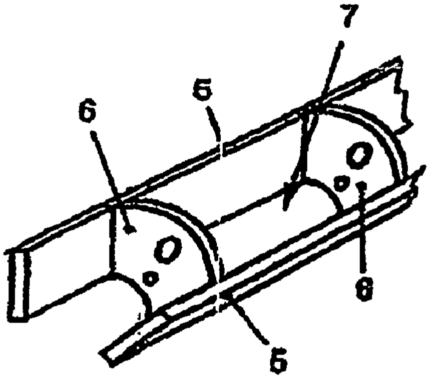
FIG. 3 shows a schematic perspective view of part of a basic rotor.

According to FIG. 2, a rotor system $R_2$ according to the invention exhibits a basket-like, open type of construction in which no closed shell is provided but rather the basic rotor 1 is composed in a box-like manner of individual, radially spaced-apart segments 5, axially spaced-apart retaining plates 6 being provided between the individual segments 5, see FIG. 3, and forming "cassettes" 7 with the segments 5.

Figure 4:
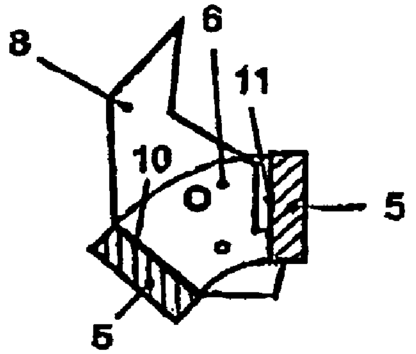
FIG. 4 shows a schematic cross section through two adjacent segments of the basic rotor, with inserted tool carrier plate.

Tool carriers or tool carrier plates 8 can be releasably secured, in particular screwed, to the retaining plates 6. The tool carrier or the tool carrier plate 8 serves to accommodate at least one tool 9, see FIG. 2. A further advantage of the present invention is that the tool carrier or the tool carrier plate 8, due to its configuration, is connected to the basic rotor 1 in a positive-locking manner, as indicated in particular in FIG. 4.

In this case, the tool carrier plate 8 bears against respective inner bearing surfaces 10, 11 of two adjacent segments 5, so that the tool carrier plate 8 or the tool carrier is inserted in a positive-locking manner in the basic rotor 1 or between the segments 5. The tool carrier plate 8 can be additionally fastened to or held on the retaining plates 6 in a frictional manner by additional fastening elements or fastening screws (not shown in any more detail here). On account of the shaping of the tool carrier plate 8, the tool carrier or the tool carrier plate 8 anchors itself in the basic rotor 1, see FIG. 4, fastening elements, in particular fastening screws, for the releasable securing of the tool carrier plate 8 to the retaining plate 6, only having to be stressed in tension. In this way, a frictional and positive-locking connection free of play is realized.

The basic rotor 1 is constructed in such a way that the number of screwed-on tool carriers or tool carrier plates 8 can be varied. This can be advantageous if, for example when working different soils, clogging of the rotor, binding of the rotor, etc., is to be prevented, or if different degrees of freedom are to be set.

Figure 5A:
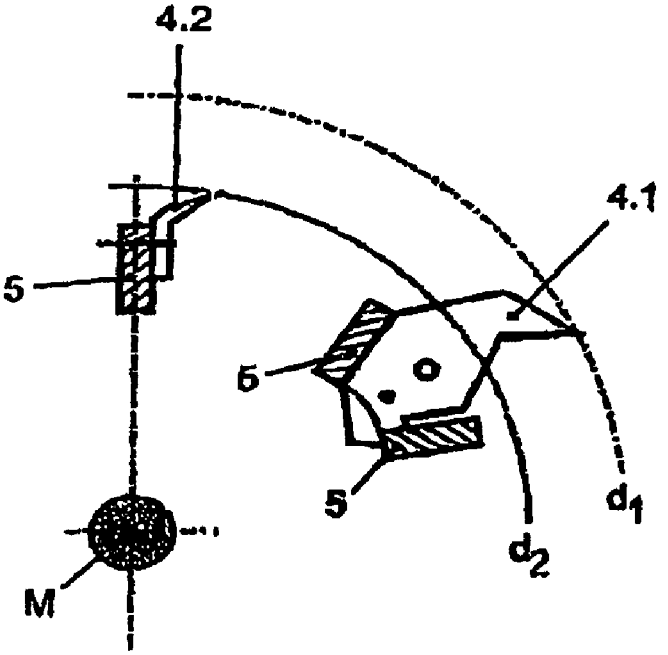
FIG. 5*a* shows a schematic plan view of a partial cross section of the basic rotor with tools inserted differently.
Figure 5B:
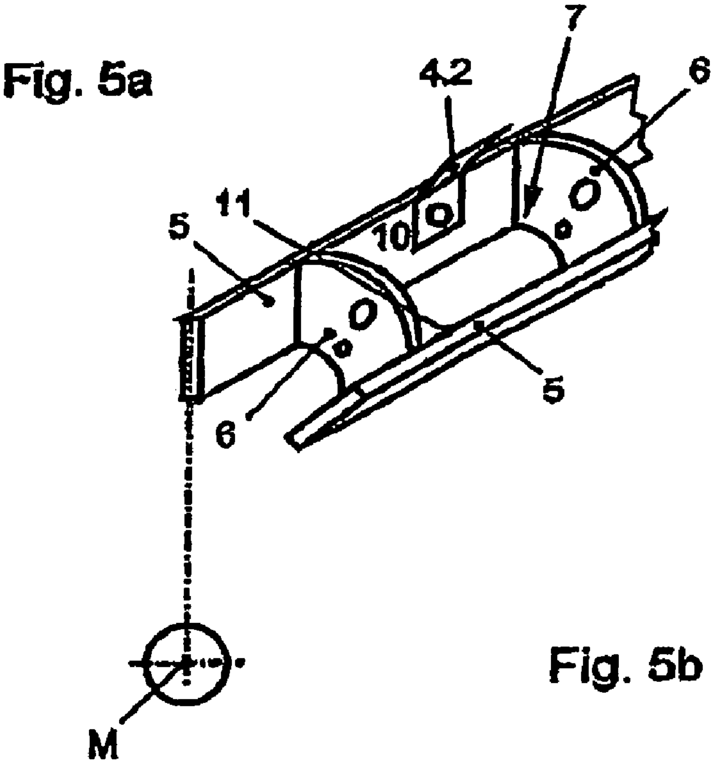
FIG. 5*b* shows a schematic perspective view of two adjacent segments of the basic rotor with an inserted tool.

A combination of two tools 4.1, 4.2 is shown in FIGS. 5*a* and 5*b*. As shown in cross section in FIG. 5*a* and as indicated in FIG. 5*b*, the tool 4.1 is a type of narrow, pointed tool having an effective diameter $d_1$.

In addition, the tools 4.2 having a smaller effective diameter $d_2$ may be fastened to the basic rotor 1. The tools 4.2 are designed to be more like a blade and to be wider than the tools 4.1. Under certain working conditions, e.g. when tilling bush-like terrain, it is advisable to use the tools 4.2. The effective diameter $d_2$ is intended to work right down to the earth surface; the effective diameter $d_1$ plunges into the soil. The tools 4.2 assist the cutting-up of the bush at the surface, whereas the tools 4.1 till through the soil.

Figure 6:
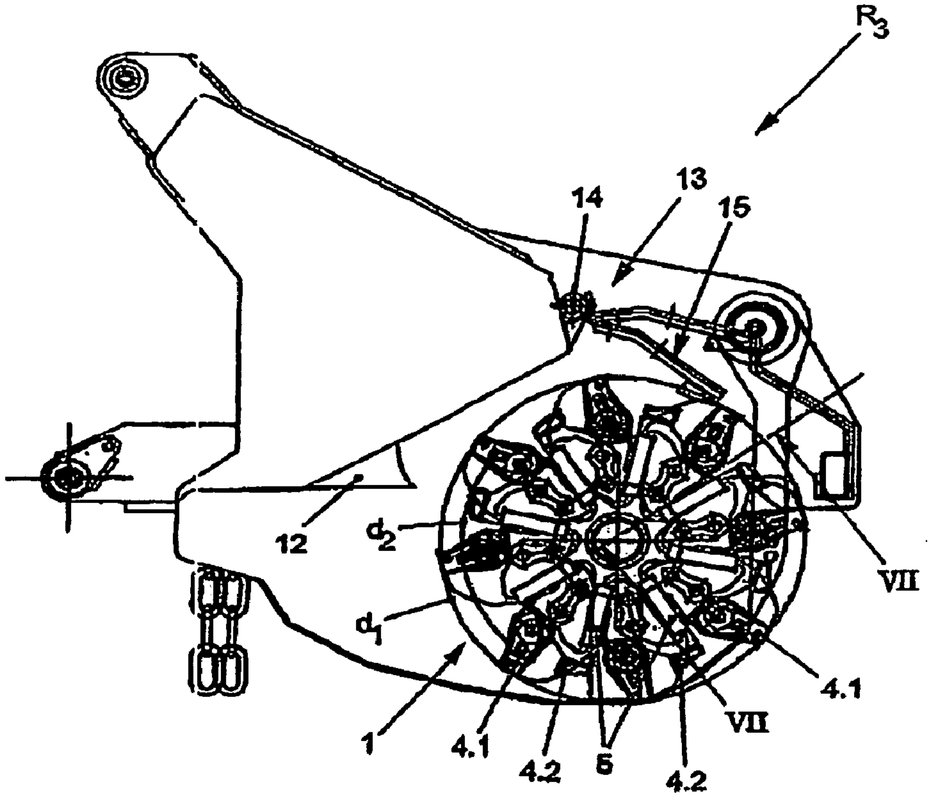
FIG. 6 shows a schematic side view of a further exemplary embodiment of a further rotor system $R_3$.

Shown according to FIG. 6 is a further rotor system $R_6$ which has a basic rotor 1 of the type described above, in which a plurality of segments 5 are provided. It has proved to be advantageous in this case to arrange the tools 4.1, 4.2 on different effective diameters $d_1$, $d_2$.

At least one counter blade 12 is preferably provided, which interacts with the inner and outer tools 4.1, 4.2, different cutting gaps being formed in between.

Furthermore, it has proved to be advantageous in the present invention that a counter blade 15 is provided inside a housing 13 of the rotor system $R_3$, which counter blade 15 is movable, in particular pivotable, about a joint 14 and can be firmly set, or if need be is also variable about the joint 14 during operation.

In this way, a cutting gap, for example between effective diameter $d_1$ and tool 4.1 or 4.2, can be set in any desired manner. The cutting-up process can be influenced as a result.

In particular, the cutting-up of organic substances, such as wood for example, optimizes the cutting-up process in the rotor system $R_3$. In addition, lower wear of the basic rotor 1 designed as stepped rotor occurs with a smaller number of tools 4.1 and/or 4.2, in particular with a smaller number of teeth. Furthermore, the individual tools 4.1, 4.2 are arranged radially offset and lie axially on the basic rotor 1 in different effective planes A, B.

Figure 7:
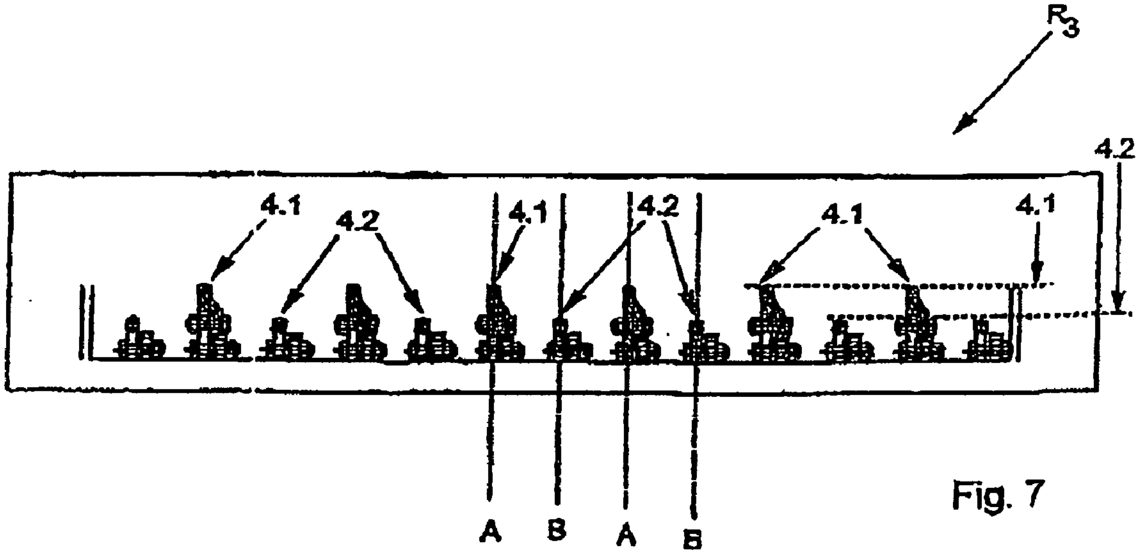
FIG. 7 shows a partial longitudinal section through the rotor system $R_3$ according to FIG. 6.

In addition, said tools 4.1, 4.2, as also indicated in FIG. 7, have different effective diameters $d_1$, $d_2$, so that additional cutting-up can be effected in the intermediate spaces.

In particular, the different effective planes A, B are also shown here, so that, as viewed in partial cross section, the tools 4.1, 4.2 are arranged alternately in the different effective planes A and B over the complete axial length of the basic rotor 1.

In this way, a cutting-up process, likewise assisted by the movable counter blade 15, can also be optimized for reducing the wear of the tools 4.1, 4.2.

Figure 9:
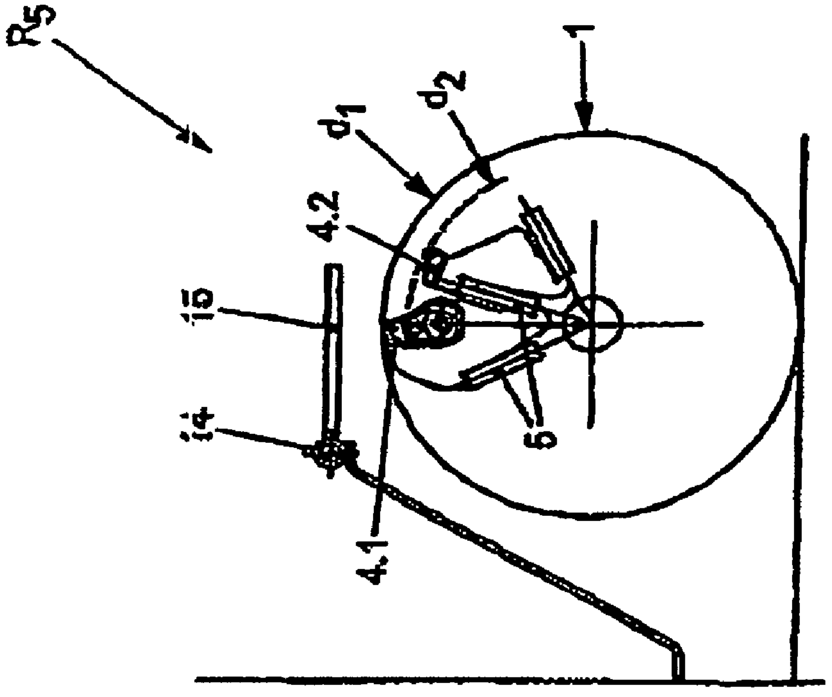
FIGS. 8 and 9 show schematic side views of further rotor systems $R_4$, $R_5$.
Figure 8:
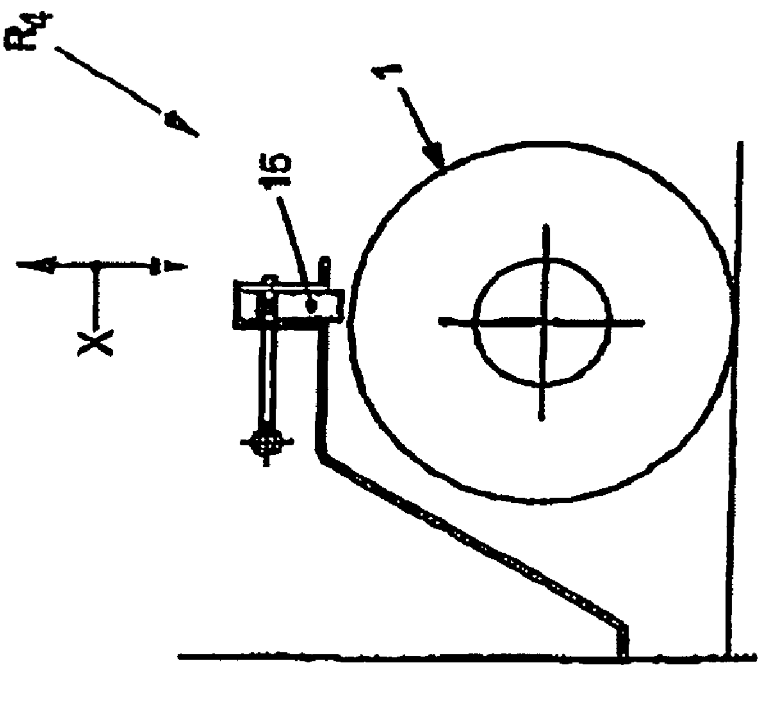

In a further exemplary embodiment of the present invention according to FIGS. 8 and 9, instead of a pivotable counter blade 15, a linearly displaceable counter blade 15 which is movable as shown in double arrow direction X may also be provided in further rotor systems $R_4$ and $R_5$. In this case, this counter blade 15 can be moved back and forth in a plurality of steps in a linearly movable, displaceable or latchable manner in double arrow direction X shown.

In the exemplary embodiment of the present invention according to FIG. 9, a rotor system $R_5$ is shown which roughly corresponds in a simplified manner to that according to FIG. 6.

However, the counter blade 15 here is at a further distance from the tool 4.1, so that the material to be cut up, in particular wood, can likewise be influenced by a larger cutting gap.

Figure 11:
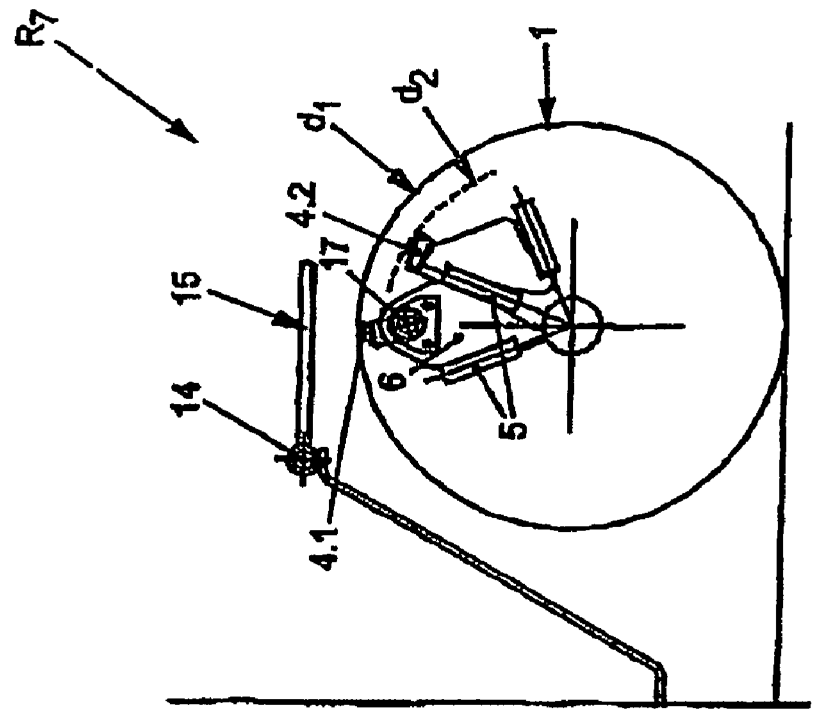
FIGS. 10 and 11 show side views of further rotor systems $R_6$, $R_7$ with movable or pivotable outer tools.
Figure 10:
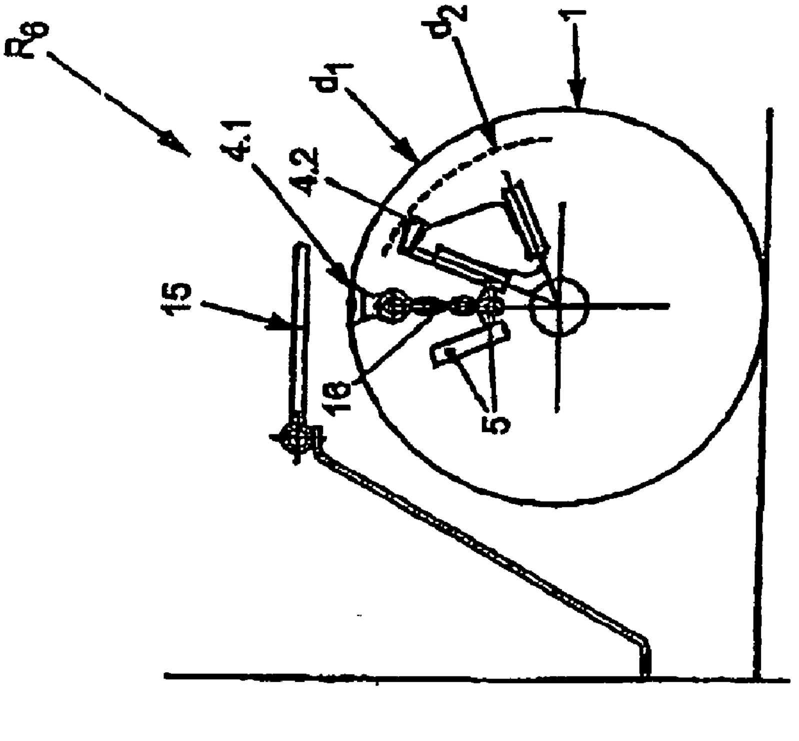

In two further exemplary embodiments of the present invention according to FIGS. 10 and 11, the tools 4.1 are preferably designed to be movable between the segments 5. In the exemplary embodiment according to FIG. 10, the tool 4.1 is secured to the basic rotor 1, in particular between the segments 5, by means of a chain 16. The chain 16 is a flexible element and allows a movement, even a radial movement, of the tools 4.1. During the rotation of the basic rotor 1, the tool 4.1 is located on the effective diameter $d_1$ via the centrifugal force.

Furthermore, it is intended to be within the scope of the invention that the tool 4.1, as shown in the exemplary embodiment of the rotor system $R_7$ according to FIG. 11, is secured to the retaining plate 6 via, for example, oscillating or push-in pivots 17 such that it can pivot about the latter, the tool 4.1 being oriented on the outside to the effective diameter $d_1$ likewise by the centrifugal force, in particular the revolution of the basic rotor 1.

The rotor systems $R_6$, $R_7$ have the advantage that they are also suitable for cutting up relatively thick wood, in particular for driving into the latter, the areas of application being reduced as a result and jamming of the basic rotor 1 being prevented.

The scope of the present invention is also intended to include, for example, the design of articulated connections or flexible retaining plates of that kind, instead of the chain 16, in order to secure the tool 4.1 to the basic rotor 1 in a movable, in particular an articulated, manner. The present invention is not restricted thereto.

The invention claim is:

1. A rotor system for tillers comprising a rotor (1) rotating about an axis (M), a plurality of segments (5) arranged radially on the rotor (1) at a distance spaced apart about the axis (M), a plurality of retaining plates (6) extending between adjacent spaced apart segments (5), a plurality of tool carrier plates (8) for carrying tools arranged on the retaining plates (6) wherein the tools are at different effective diameters ($d_1$ and $d_2$ ) and the tools (4.1 and 4.2) are arranged in different effective planes (A and B) in the axial direction of the rotor (1).

2. A rotor system for tillers comprising a rotor (1) rotating about an axis (M), tool carrying means arranged on the rotor (1) for carrying tools wherein the tools are arranged along substantially the extent of the axis (M) of the rotor at different effective diameters ($d_1$ and $d_2$) and the tools (4.1 and 4.2) are arranged along substantially the extent of the axis (M) of the rotor in different effective planes (A and B), wherein the carrying means comprises a plurality of carrier plates for accommodating the tools (4.1, 4.2), and means for releasably connecting different carrier plates (8) or different tools (4.1, 4.2) for producing the different effective diameters ($d_1$, $d_2$) to the rotor (1).

3. A rotor system as claimed in claim 2, wherein at least one counter blade (15) is associated with and movable toward the rotor (1).

4. The rotor system as claimed in claim 3, wherein the at least one counter blade (15) is mounted inside a housing (13) is movable about a joint (14) on the housing (13).

5. The rotor system as claimed in claim 4, wherein the counter blade (15) is automatically pivotable during operation of the rotor system.

6. The rotor system as claimed in claim 5, wherein the pivotable counter blade (15) is arranged downstream of a rigid counter blade (12).

7. The rotor system as claimed in claim 6, wherein a cutting gap between an effective diameter ($d_1$) of the tools (4.1) is varied by the pivotable counter blade (15).

8. The rotor system as claimed in claim 2, wherein the tool carrier plates (8) accommodate tool carriers and/or tools (4.1, 4.2).

9. The rotor system as claimed in claim 2, wherein a plurality of retaining plates (6) for accommodating tool carriers (8) and/or tools (4.1, 4.2) are provided between a plurality of individual radially arranged segments (5) on the rotor.

10. The rotor system as claimed in claim 9, wherein the plurality of retaining plates (6) are provided between individual segments (5).

11. The rotor system as claimed in claim 9, wherein the plurality of segments (5) are arranged radially at a distance apart about a center axis (M), and a plurality of retaining plates (6) for accommodating tool carriers (8) and/or tools (4.1, 4.2) are provided at an axial distance apart between the individual segments (5).

12. The rotor system as claimed in claim 11, wherein the tool carrier (8) and/or tool (9) are connected to the at least one segment (5) and/or to the retaining plate (6) between the segments (5).

13. The rotor system as claimed in claim 12, wherein the tools (4.1 and 4.2) are arranged in different effective planes (A and B) in the axial direction of the rotor (1).

14. The rotor system as claimed in claim 12 or 1, wherein the tools (4.1, 4.2) are arranged alternately in the different effective planes (A and B) on the rotor (1) in the axial direction.

15. The rotor system as claimed in claim 2, wherein the tools (4.1) are secured to the rotor (1) in a movable manner.

16. The rotor system as claimed in claim 15, wherein the tools (4.1) are connected to the rotor (1) by means of a chain (16).

17. The rotor system as claimed in claim 15, wherein the tools (4.1) are assigned to the rotor (1) by at least one pivot point (17).

18. A rotor system as claimed in claim 2, wherein the rotor (1) comprises a plurality of segments (5) to which a carrier plate (8) and/or a tool (9) is releasably inserted.

* * * * *